United States Patent
Bacher et al.

(10) Patent No.: US 6,537,454 B1
(45) Date of Patent: Mar. 25, 2003

(54) DEVICE FOR INFLUENCING THE FLOW-THROUGH OF PLASTIC MATERIAL WHICH IS HEATED SUCH THAT IT CAN FLOW THROUGH A HOUSING

(76) Inventors: Helmut Bacher, Bruck Hausleiten 17, St. Florian A-4490 (AT); Helmuth Schulz, Badstrasse 20, St. Florian A-4490 (AT); Georg Wendelin, Waldbothenweg 84, Linz A-4033 (AT)

(*) Notice: Subject to any disclaimer, the term of this patent is extended or adjusted under 35 U.S.C. 154(b) by 0 days.

(21) Appl. No.: 09/762,446
(22) PCT Filed: Jul. 21, 1999
(86) PCT No.: PCT/AT99/00183
§ 371 (c)(1),
(2), (4) Date: Feb. 5, 2001
(87) PCT Pub. No.: WO00/07800
PCT Pub. Date: Feb. 17, 2000

(30) Foreign Application Priority Data

Aug. 6, 1998 (AT) ................................................ 1361/98

(51) Int. Cl.⁷ .......................... B29C 47/68; B01D 29/96; B01D 29/62; B01D 35/12
(52) U.S. Cl. ........................ 210/236; 210/447; 210/186; 425/190; 425/199; 425/225
(58) Field of Search ................................. 210/236, 184, 210/186, 447; 425/190, 199, 225

(56) References Cited

U.S. PATENT DOCUMENTS 3,007,199 A * 11/1961 Curtis
3,900,399 A * 8/1975 Kreyenburg et al.
4,059,525 A * 11/1977 Krasnow
4,395,212 A * 7/1983 Lambertus
4,416,605 A * 11/1983 Konno et al.
5,770,246 A   6/1998 Fujikawa

FOREIGN PATENT DOCUMENTS

EP    0 050 949 A    5/1982
GB    2 073 038 A    10/1981

* cited by examiner

Primary Examiner—Thomas M. Lithgow
(74) Attorney, Agent, or Firm—Salter & Michaelson

(57) ABSTRACT

A device for controlling the flow of plastics material, heated until flowable, through a housing, in particular a filtering device or a direction-control device for the plastics material, comprises a flow channel extending through the housing, and a plunger of circular cross-section longitudinally displaced in a bore of the housing transversely to the longitudinal direction of the flow channel. The plunger crosses the flow channel. An unslotted scraper ring is mounted outside the housing on a portion of the plunger projecting from the housing and is held by a stop so that the plunger is displaceable relative to the scraper ring. The inner diameter ($d_2$) of the scraper ring is smaller than the diameter ($d_0$) of the bore of the housing and also smaller than the diameter ($d_1$) of the end of the plunger portion remote from the housing in the coldest operating state of that plunger portion. The scraper ring is always pretensioned on the plunger portion and therefore reliably scrapes off leaked material adhering to and carried by the plunger when the latter moves out of the housing.

9 Claims, 2 Drawing Sheets

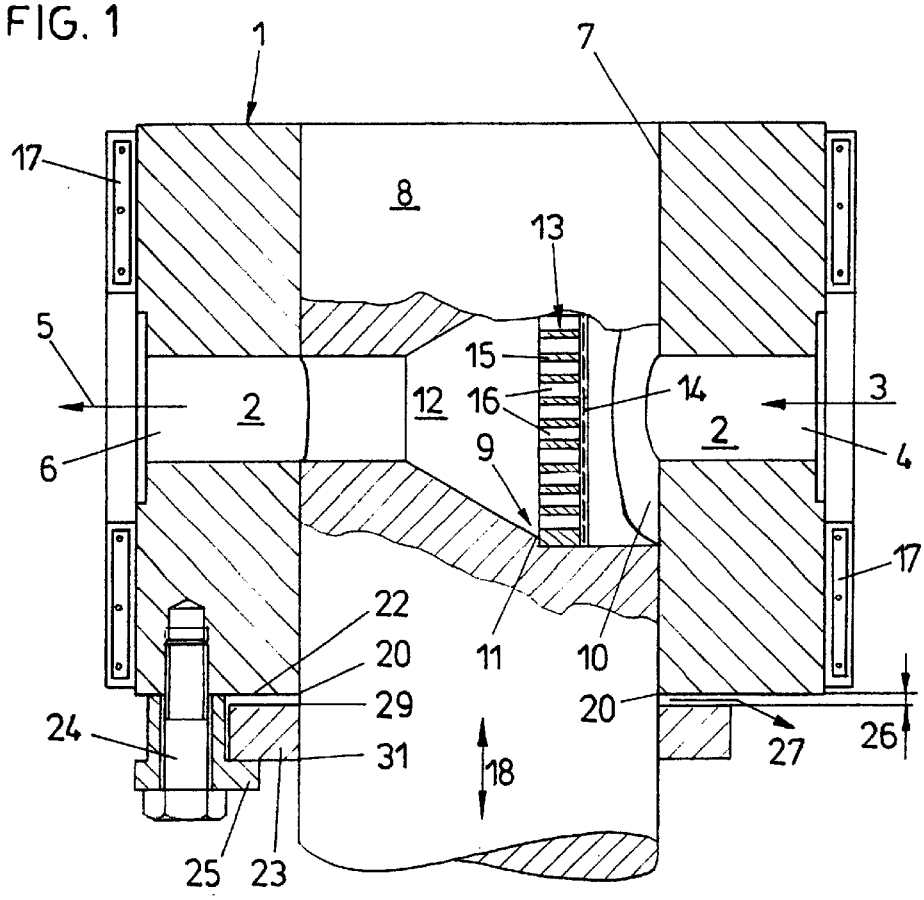
FIG. 1
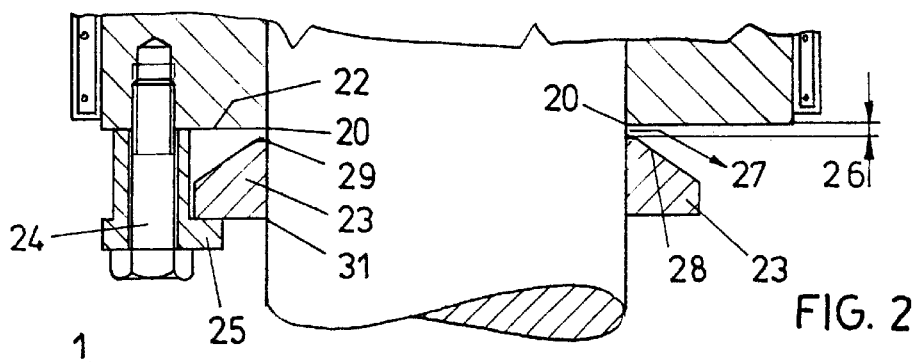
FIG. 2
FIG. 4

DEVICE FOR INFLUENCING THE FLOW-THROUGH OF PLASTIC MATERIAL WHICH IS HEATED SUCH THAT IT CAN FLOW THROUGH A HOUSING

BACKGROUND

1. Technical Field

The invention relates to a device for controlling the flow of plastics material, heated until flowable, through a housing, in particular a filtering device or a direction-control device for the plastics material, comprising a flow channel extending through the housing, and a plunger of circular cross-section longitudinally displaced in a bore of the housing transversely to the longitudinal direction of the flow channel and crossing the flow channel, wherein an unslotted scraper ring is mounted outside the housing on a portion of the plunger projecting from the housing, a stop connected to the housing being provided for the scraper ring so that the plunger is displaceable relative thereto.

2. Related Art

Various types of these devices are known. One example is a filtering device for plasticised thermoplastic material, in which the plunger carries a filter arranged in the flow channel when the device is in the operating position, the filter filtering out impurities from the plasticised plastics material. Another type is a device for changing the direction of flow of the plastics material. In this case, the flow of the plastics material through the housing is always controlled by the longitudinal displacement of the plunger. In the case of a filtering device, the aforementioned displacement of the plunger moves the filter into a screen-changing position or a backwashing position so that the filter can be replaced or cleaned (e.g. AT 395 825 B, EP 250 695 B). In the case of a direction-control device, the displacement of the plunger causes the plastics material introduced into the housing to leave the housing through a different outlet opening than during the normal operating state or, for example in the case of a gate valve, the plastics material is totally prevented from flowing through the housing.

In devices of the described type, plastics material unavoidably escapes from the housing during the longitudinal displacement of the plunger, even though the plunger is displaced in the housing with minimum clearance to ensure as little leakage as possible. The plastics material forcibly drawn out of the interior of the housing during the movement of the plunger is decomposed by heat and the effect of atmospheric oxygen. The resulting carbonized mass forms a hard layer which surrounds the plunger and which has substantially lost its plastics character. The purpose of the scraper ring is to scrape this hard layer of leaked material off the plunger during its longitudinal displacement relative to the housing. However, tests have shown that the following difficulties arise here:

The portion of the plunger projecting from the housing is not heated and is therefore subject to a temperature decrease of approximately 100° C. over its axial, non-heated length. This means that the diameter of the plunger is smaller at its end projecting from the housing than in the remaining portion by some tenths of a millimeter, depending on the size of this diameter, owing to the reduced thermal expansion in accordance with its lower temperature. Therefore, when the plunger moves into the heated housing, the burnt-on layer of material is scraped off by the housing edge or the scraper ring only until it corresponds to the bore diameter of the housing or the inner diameter of the scraper ring. Consequently, a layer of this material remains at the colder end of the plunger and is of a thickness conforming to the smaller diameter attributable to the reduced thermal expansion of this end of the plunger. During the dwell time of the plunger in the position in which it is retracted into the housing, e.g. the filtering position in the case of a filtering device or the normal position of the direction-control device or the like, this plunger portion heats up to the housing temperature and therefore expands accordingly. The coating of carbonized plastic on the plunger is densified as a result. This uncontrollably impedes the movement of the plunger back out again, possibly even jamming the plunger and with it the entire device.

The object of the invention is to overcome these difficulties and improve a device of the initially described type so that its operation is more reliable.

SUMMARY

The invention achieves this object by the inner diameter of the scraper ring being smaller than the diameter of the bore of the housing and also smaller than the diameter of the end of the plunger portion remote from the housing and projecting therefrom in the coldest operating state of that plunger portion so that the scraper ring is always pretensioned on the latter. This close fit of the scraper ring on the plunger means that the scraper ring is always pretensioned on the plunger, irrespective of the temperature-induced expansions or contractions which the plunger undergoes. Naturally, this means that corresponding tensile stresses occur in the scraper ring, but selecting the material for the scraper ring, in particular its heat resistance values, so that the tensile stresses occurring are absorbed without causing the scraper ring to fracture does not give rise to any difficulties because the temperatures occurring are at least substantially known.

According to the invention, the inner diameter of the scraper ring is preferably smaller than the diameter of the bore of the housing by 0.12% to 0.15%. Experiments have shown this range to be suitable for most applications.

The amount of pretension with which the scraper ring is mounted on the plunger portion is to be selected in accordance with the prevailing conditions. Generally, within the framework of the invention, the arrangement is such that the scraper ring is mounted on the plunger with an average contact pressure of 1000–2000 N/cm².

According to a further development of the invention, a clearance of 0 mm to 4 mm, measured in the axial direction of the plunger and bounded by the stop, is provided between the scraper ring and the housing. The zero value, i.e. no clearance, applies to devices used for low-viscosity plastics, e.g. PET premonomers or waxes or the like. With these plastics, there is also the danger of material leaking out when the plunger is extended and there is high mass pressure in the housing. In this case, the scraper ring without axial clearance acts like a gland. For high-viscosity plastics, however, the aforementioned amount of clearance between the scraper ring and the housing is possible and, in the region of this axial clearance, leaked material can issue freely when the plunger is extended.

The subject of the invention is shown schematically in the drawings by means of embodiments.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which:

FIG. 1 shows a device, formed as a filtering device for plastics material, in section along the plunger axis with axial clearance for the scraper ring;

FIG. 2 shows a variant of the scraper ring, in section according to FIG. 1;

FIG. 4 shows an embodiment without axial clearance for the scraper ring, in section according to FIG. 1.

DETAILED DESCRIPTION OF THE PREFERRED EMBODIMENTS

Figure 3:
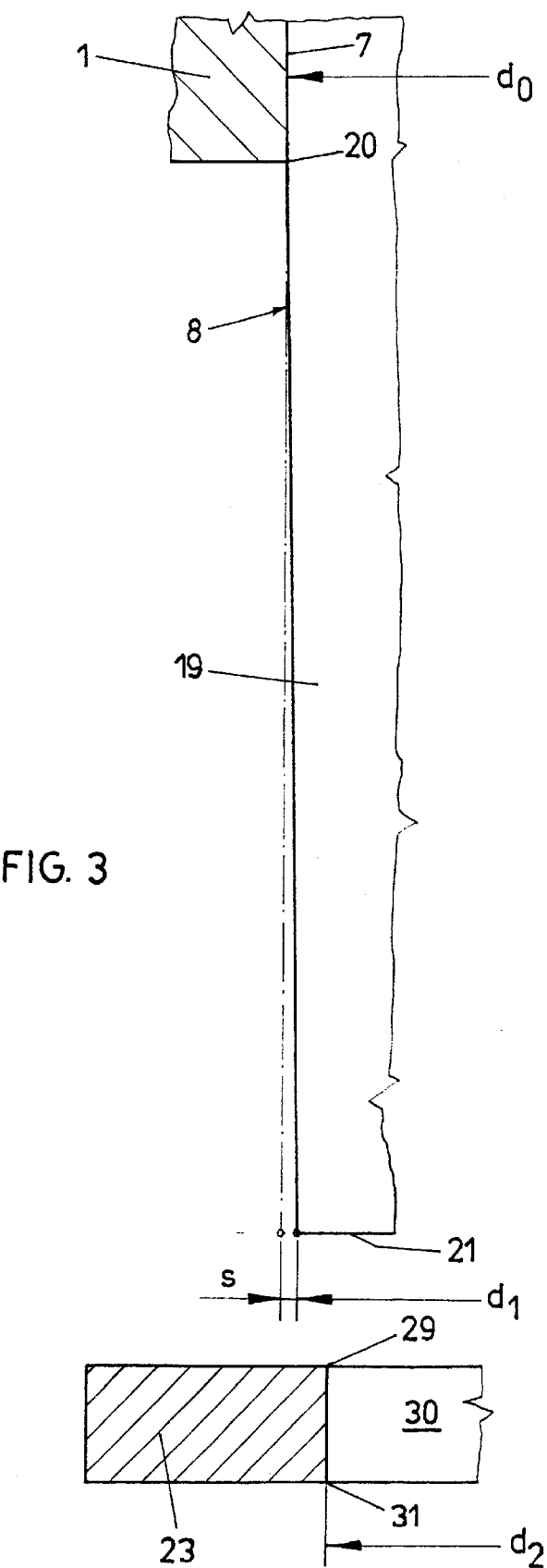
FIG. 3 schematically shows the plunger extended from the housing and the scraper ring removed therefrom, in section according to FIG. 1.

In the filtering device shown in FIG. 1, a housing 1 has a flow channel 2 for a flowable mass to be filtered, in particular thermoplastic material to be cleaned of impurities for recycling purposes. The material to be filtered enters flow channel 2 through an inlet opening 4 in the direction of arrow 3. A filtrate flows out of housing 1 through an outlet opening 6 in the direction of arrow 5. A bore 7, crossing flow channel 2, extends perpendicularly to the axial direction thereof. A plunger 8 of circular cross-section is longitudinally displaceable in bore 7, but guided with a close fit. A nest of screens 9 is incorporated into a plunger 8 and has an inlet chamber 10 for the material to be filtered, chamber 10 having a larger diameter than flow channel 2 and merging via a stepped shoulder 11 into a frustum-shaped outlet chamber 12 leading to the outlet side of flow channel 2. A filter 13 for separating the impurities from the supplied plastics material is arranged between inlet chamber 10 and outlet chamber 12. Filter 13 has an actual filtering layer 14 which can be formed by a metal plate provided with fine through openings dimensioned so that the impurities to be separated out are held back. This filtering layer 14 is strengthened by a supporting plate 15 supported against stepped shoulder 11. Supporting plate 15 has channel-type openings 16, the diameter of which are substantially greater than that of the through openings of the filtering layer 14.

An electric resistance heater 17, by means of which the device and also the plastics material flowing in the device can be held at the desired operating temperature, is arranged on the outer casing of the housing 1.

In order to be able to clean or replace filter 13, plunger 8, constituting a screen carrier, is displaceable in the axial direction (double arrow 18) in its guide formed by bore 7. A drive (not shown) is provided for this purpose. As a result of this axial displacement, a portion 19 (FIG. 3) of the axial length of plunger 8 projects from housing 1 at least intermittently and is therefore not heated. Plunger Portion 19 therefore has a lower temperature than the portion of plunger 8 inside housing 1, or assumes this lower temperature over the course of time. Furthermore, as a result of the aforementioned axial displacement of plunger 8, plastics melt, in particular of film thickness, is drawn out of the interior of housing 1 through the unavoidable non-tight points and remains at least in part on the casing of plunger portion 19 projecting from housing 1. Because portion 19 of plunger 8 projecting from housing 1 is exposed to atmospheric oxygen, the plastics melt on its casing is decomposed and, within a short time, carbonized. Consequently, it loses its thermoplastic properties and, during the course of time, forms a hard layer surrounding this plunger portion 19. It has hitherto been assumed that this layer is sheared off by a housing edge 20 when plunger 8 moves back into housing 1. However, this is only in small part the case because portion 19 of plunger 8 projecting from housing 1 is subject to a considerable temperature decrease over its non-heated length, this temperature decrease being approximately 100° C. when treating thermoplastic material. This means that an end 21 (FIG. 3) of plunger portion 19 projecting from housing 1 has a diameter which, owing to the reduced thermal expansion, is smaller by some tenths of a millimeter than the diameter of plunger portion 8 still in housing 1. Consequently, a layer of carbonized plastics material, the thickness of which corresponds at any point to the aforementioned difference in thermal expansion, remains on the colder end 21 of plunger 8 when it moves back into housing 1. However, when plunger 8 moves back into housing 1, the previously cooler plunger portion 19 of plunger 8 is heated to the temperature of housing 1 and therefore expands accordingly. The coating of carbonized plastics on the periphery of plunger 8 is densified by this plunger expansion and impedes or prevents the re-emergence of plunger 8.

To overcome these difficulties, an unslotted scraper ring 23 is fixed to a side wall 22 of housing 1 facing the free end 21 of plunger 8 so that it cannot move relative to side wall 22 or can only move within limits during the longitudinal displacement of plunger 8. In this way, scraper ring 23 provides a scraping function, by means of which the plastics layer, which is carried by plunger 8 when it moves out of housing 1, is scraped off plunger 8. To ensure this for all temperature conditions of plunger 8 or its plunger portion 19, scraper ring 23 is mounted on plunger 8 with a pretension which exceeds all temperature-induced expansions and contractions. It has been demonstrated that it is sufficient to dimension the inner diameter $d_2$ (FIG. 3) so as to be 0.12% to 0.15% smaller than the diameter $d_0$ of bore 7 of housing 1, in which plunger 8 is guided, this diameter $d_0$ consequently also being provided at housing edge 20 of housing 1. The inner diameter $d_2$ of scraper ring 23 is therefore with certainty smaller than the diameter $d_1$ of the coolest point on plunger portion 19 (front end 21) when plunger 8 is extended. In this connection:

$$d_1 = d_0 - (d_0 \cdot \alpha \cdot \Delta t)$$

where $d_0$ has the meaning given above, $\alpha$ is the expansion coefficient for plunger 8 and $\Delta t$ is the temperature difference between front end 21 and the portion of the plunger 8 remaining in the housing 1. As shown in FIG. 3, this smaller diameter $d_1$ results in a clearance "s" for front end 21 in relation to housing edge 20, wherein $$s = \frac{d_0 - d_1}{2}$$

The contact pressure between scraper ring 23 and plunger portion 19 of plunger 8 to be scraped should advantageously lie between 1000 and 2000 N/cm². Care must be taken that the tensile forces occurring in scraper ring 23 do not exceed the allowable heat resistance value of the material used for scraper ring 23.

Scraper ring 23 can be immovably fixed to side wall 22 of housing 1, e.g. by means of a screw connection 24 (FIG. 4). Scraper ring 23 is then mounted on housing 1 in the manner of a gland. This type of construction is suitable for low-viscosity plastics, e.g. PET premonomers or waxes. However, for high-viscosity plastics it is more advantageous to provide scraper ring 23 with clearance, enabling it to move in the axial direction of plunger 8 relative to housing 1. This clearance 26 can be seen from the embodiments according to FIGS. 1 and 2. It is limited by a stop 25 held by the screw connection 24. A clearance of up to 4 mm has proved advantageous. This clearance 26 enables leaked material to pass through the unavoidable non-tight points between housing 1 and plunger 8 at housing edge 20 in the direction of arrow 27 when plunger 8 moves out of housing 1. The embodiment according to FIG. 2 permits better discharge of this leaked material by providing scraper ring 23 with a chamber 28, in particular when the device is arranged so that the longitudinal axis of plunger 8 extends vertically and the leaked material can thus flow downwards.

As a result of the close fit of scraper ring 23 on plunger 8, as mentioned hereinabove, scraper ring 23 scrapes the leaked material carried by plunger 8 from the plunger surface when plunger 8 moves out of housing 1. An edge 29, adjacent to housing 1, of a central opening 30 (FIG. 3) in scraper ring 23 is chiefly effective here. Any material still remaining on the periphery of the plunger is scraped off plunger 8 by an edge 31—remote from housing 1—of central opening 30 in scraper ring 23 when plunger 8 returns, i.e. is retracted into housing 1.

The device does not necessarily have to be constructed as a filtering device. Plunger 8 can also have the function of a closing member, for example, wherein the axial displacement of plunger 8 has the effect of closing off flow channel 2. A variant of this is to provide channels in plunger 8 so that, when the plunger 8 is in the normal operating position, the flow of the treated material through flow channel 2 is not impeded, whereas in a different operating position of plunger 8, in which the latter is displaced axially in relation to housing 1, the material enters housing through inlet opening 4, but leaves housing 1 through an opening other than outlet opening 6, the material flow being diverted accordingly by the aforementioned channels in plunger 8.

What is claimed is:

1. A device for controlling the flow of plastics material, heated until flowable, through a housing, comprising:
a flow channel extending through the housing, and a plunger of circular cross-section longitudinally displaced in a bore of the housing transversely to the longitudinal direction of the flow channel and crossing the flow channel, wherein an unslotted scraper ring is mounted outside the housing on a portion of the plunger projecting from the housing, a stop connected to the housing being provided for the scraper ring so that the plunger is displaceable relative thereto, wherein the inner diameter ($d_2$) of the scraper ring is smaller than the diameter ($d_0$) of the bore of the housing and smaller than the diameter ($d_1$) of an end of the plunger portion remote from the housing and projecting therefrom in the coldest operating state of that plunger portion so that the scraper ring is always pretensioned on the latter and scrapes off a plastic layer carried by the plunger when it moves out of the housing.

2. The device of claim 1, wherein the inner diameter ($d_2$) of the scraper ring is smaller than the diameter ($d_0$) of the bore of the housing by 0.12% to 0.15%.

3. The device of claim 1, wherein the scraper ring is mounted on the plunger with an average contact pressure of 1000 to 2000 N/cm$^2$.

4. The device of claim 1, wherein a clearance of 0 mm to 4 mm, measured in the axial direction of the plunger and bounded by the stop, is provided between the scraper ring and the housing.

5. The device of claim 2, wherein the scraper ring is mounted on the plunger with an average contact pressure of 1000 to 2000 N/cm$^2$.

6. The device of claim 2, wherein a clearance of 0 mm to 4 mm, measured in the axial direction of the plunger and bounded by the stop, is provided between the scraper ring and the housing.

7. The device of claim 3, wherein a clearance of 0 mm to 4 mm, measured in the axial direction of the plunger and bounded by the stop, is provided between the scraper ring and the housing.

8. The device of claim 1, wherein the device is a filtering device for the plastics material.

9. The device of claim 1, wherein the device is a direction-control device for the plastics material.

* * * * *